United States Patent
Sjoeroos et al.

(10) Patent No.: US 12,046,920 B2
(45) Date of Patent: Jul. 23, 2024

(54) WIRELESS POWER RELAY WITH CONSTANT POWER CONTROLLED CONVERTER

(71) Applicant: Apple Inc., Cupertino, CA (US)

(72) Inventors: Jukka-pekka J. Sjoeroos, Cupertino, CA (US); Antoin J. Russell, San Francisco, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 517 days.

(21) Appl. No.: 17/306,716

(22) Filed: May 3, 2021

(65) Prior Publication Data

US 2021/0344232 A1  Nov. 4, 2021

Related U.S. Application Data

(60) Provisional application No. 63/019,666, filed on May 4, 2020.

(51) Int. Cl.
 *H02J 50/50* (2016.01)
 *H02J 50/80* (2016.01)
 *H04R 25/00* (2006.01)

(52) U.S. Cl.
 CPC .............. *H02J 50/50* (2016.02); *H02J 50/80* (2016.02); *H04R 25/602* (2013.01); *H02J 2310/22* (2020.01); *H04R 2225/31* (2013.01)

(58) Field of Classification Search
 CPC ........ H02J 50/50; H02J 50/80; H02J 2310/22; H04R 25/602; H04R 2225/31

(Continued)

(56) References Cited

U.S. PATENT DOCUMENTS

| 5,642,267 | A | * | 6/1997 | Brkovic | ................. | G05F 1/613 |
|   |   |   |   |   |   | 323/224 |
| 8,180,286 | B2 | * | 5/2012 | Yamasuge | ............... | H02J 50/80 |
|   |   |   |   |   |   | 320/108 |

(Continued)

FOREIGN PATENT DOCUMENTS

| CN | 107925268 A | * | 4/2018 | ............. H02J 50/10 |
| CN | 109417309 A | * | 3/2019 | ............. H02J 50/10 |

(Continued)

OTHER PUBLICATIONS

Robert Sheehan, Texas Instrument,Understanding and Applying Current-Mode Control Therapy, Oct. 31, 2007 (Year: 2007).*

(Continued)

*Primary Examiner* — M Baye Diao
(74) *Attorney, Agent, or Firm* — FLETCHER YODER PC

(57) ABSTRACT

A wireless power relay can include a first wireless power receiver (Rx1) configured to receive power from a first wireless power transmitter (Tx1) in another device and a second wireless power transmitter (Tx2) configured to deliver power to a second wireless power receiver (Rx2) in another device. Rx1 may be configured to communicate with Tx1 via a first communication link, and the Tx2 may be configured to receive communication from Rx2 via a second communication link, both employing modulation of the wireless power signal. The relay may further include a power converter with its input coupled to Rx1 and its output coupled to Tx2 and a constant power controller configured to isolate modulated communication between the communication links. Additionally or alternatively, the relay may include circuitry configured to introduce a jamming signal preventing Tx1 from detecting and improperly interpreting signals from the second communications link.

27 Claims, 7 Drawing Sheets

(58) Field of Classification Search
USPC .......................................................... 320/108
See application file for complete search history.

(56) References Cited

U.S. PATENT DOCUMENTS

| | | | | | |
|---|---|---|---|---|---|
| 8,836,171 | B2* | 9/2014 | Choi | ...................... | H02J 50/05 320/108 |
| 8,843,066 | B2* | 9/2014 | Chutorash | .............. | G08C 17/02 455/565 |
| 8,853,890 | B2* | 10/2014 | Suzuki | .................... | H04W 4/80 320/108 |
| 8,860,393 | B2* | 10/2014 | Kronmueller | ........... | G05F 1/595 323/283 |
| 8,874,040 | B2* | 10/2014 | Li | .......................... | H04W 28/22 455/296 |
| 8,928,303 | B2* | 1/2015 | Zhu | ...................... | H02M 3/156 323/285 |
| 8,952,655 | B2* | 2/2015 | Walley | .................... | H02J 50/80 320/108 |
| 9,093,215 | B2* | 7/2015 | Low | ........................ | H02J 50/12 |
| 9,780,646 | B2* | 10/2017 | Youssef | ............. | H02M 1/4216 |
| 9,954,581 | B2* | 4/2018 | Mehas | ................... | H02J 50/12 |
| 10,097,095 | B2* | 10/2018 | Vijayan | ............. | H02M 3/33571 |
| 10,770,969 | B2* | 9/2020 | Peretz | ...................... | G05F 1/575 |
| 10,784,707 | B2* | 9/2020 | Floresca | ................. | H02J 50/12 |
| 11,031,974 | B2* | 6/2021 | Li | ............................. | H04K 3/43 |
| 11,095,206 | B2* | 8/2021 | Oh | ........................ | H02M 1/083 |
| 11,218,076 | B2* | 1/2022 | Priego | .................. | H02M 3/158 |
| 11,239,696 | B2* | 2/2022 | Bhandarkar | ........ | H02M 3/1582 |
| 11,757,313 | B2* | 9/2023 | Green | .................... | H02J 50/12 307/104 |
| 2003/0142513 | A1* | 7/2003 | Vinciarelli | .............. | H02M 1/08 363/17 |
| 2010/0157638 | A1* | 6/2010 | Naiknaware | ........ | H02M 7/4807 363/131 |
| 2010/0289341 | A1* | 11/2010 | Ozaki | ..................... | H02J 50/12 307/104 |
| 2012/0299390 | A1* | 11/2012 | Kim | ....................... | H02J 50/502 307/104 |
| 2013/0005252 | A1* | 1/2013 | Lee | ......................... | H02J 50/12 307/18 |
| 2014/0152115 | A1* | 6/2014 | Wheeland | ............... | H02J 50/60 307/104 |
| 2015/0207336 | A1* | 7/2015 | Morreale | ............... | H02J 50/402 307/104 |
| 2015/0215006 | A1* | 7/2015 | Mehas | ................... | H02M 7/219 307/104 |
| 2017/0117743 | A1* | 4/2017 | Kim | ....................... | H02J 50/12 |
| 2017/0373537 | A1* | 12/2017 | Dayal | .................. | H02J 7/00034 |
| 2019/0334439 | A1* | 10/2019 | Owshanko | ........ | H02M 3/33576 |

FOREIGN PATENT DOCUMENTS

| | | | | | |
|---|---|---|---|---|---|
| EP | 4246767 | A1 | * | 9/2023 | ............. H02J 50/00 |
| KR | 101305579 | B1 | * | 3/2013 | ............. H02J 50/50 |
| KR | 20190102742 | A | * | 9/2019 | ............. H02J 50/50 |
| TW | 201338334 | A | * | 9/2013 | ............. H02J 5/005 |

OTHER PUBLICATIONS

Understanding and Applying Current-Mode Control Theory (Year: 2007).*

* cited by examiner

WIRELESS POWER RELAY WITH CONSTANT POWER CONTROLLED CONVERTER

BACKGROUND

Wireless charging has become a popular feature for personal electronic devices, including, for example, smart phones, watches, and other accessories. Wireless charging is also useful in other types of battery powered devices, including laptop computers, tablet computers, portable power stations (i.e., battery packs) and the like.

Wireless power relays may include devices in which a device acts as both a wireless power receiver (to receive power wirelessly from a transmitter) and as a wireless power transmitter (to transmit power wirelessly to another device. Such devices may include any of the aforementioned types of devices. For example, a smart phone may be configured to receive power from a wireless charger as well as deliver power wirelessly to another device. As another example, a battery case for wireless earphones or a phone or the mobile device may be configured to receive power wirelessly from a charging device to charge its own internal battery as well as deliver power wirelessly to the wireless earphones or phone or other mobile device.

SUMMARY

It is desirable to develop improved wireless power relay devices and systems to improve the efficiency, reliability, and user experience associated with such devices.

A wireless power relay device can include: a first wireless power receiver configured to receive power from a first wireless power transmitter in another device and a second wireless power transmitter configured to deliver power from the wireless power relay device to a second wireless power receiver in another device. The first wireless power receiver may be configured to communicate with the first wireless transmitter via a first communication link, and the second wireless power transmitter may be configured to receive communication from the second wireless power receiver via a second communication link, with both links employing amplitude shift keyed or other modulation of the transmitted power. The wireless power relay device may further include a power converter (for example, a buck converter) having an input coupled to the first wireless power receiver and an output coupled to the second wireless power transmitter. The power converter may include a constant power controller configured to isolate amplitude shift keyed or other power modulated communication between the first and second communication links.

The power converter of the wireless power relay device may include a power stage comprising at least one inductor and at least one switching device, a current controller configured to control the at least one switching device, an input or output current measurement circuit configured to measure the input or output current of the power stage and provide a signal corresponding to the current to the current controller, and an outer voltage loop configured to measure an output or input voltage of the power stage and provide an error signal corresponding to a difference between the voltage and a reference signal to the current controller. The current controller may be a pulse width modulation controller. The outer voltage loop may be substantially slower than the current controller. For example, the bandwidth of the current control loop may be about 100 kHz and the bandwidth of the outer voltage control loop may be about 10 Hz.

The power converter may further include a power regulation loop with an input or output voltage sensing circuit configured to receive a voltage of the power converter and to modify the error signal received from the outer voltage loop such that an increase in voltage causes a decrease in current commanded by the current controller and a decrease in the voltage causes an increase in current commanded by the current controller. The decrease and increase in current commanded may be proportional to the corresponding increase and decrease in voltage. Such a feedback loop maintains a constant power throughput of the converter, which means that the input power and output power are regulated to a constant power by changing the set-point for the current loop by the relationship: Current Set-Point=Power Set-Point/Sensed Voltage. For maximum blocking of the back-propagating or forward-propagating signal, the power calculation bandwidth or update rate for the current set-point should be as high as the current loop bandwidth e.g., about 100 kHz.

The wireless power relay device may further include a battery configured to store energy received via the first wireless power receiver and to deliver energy to the second wireless transmitter. The wireless power relay device may be a battery or other energy storage case for a portable electronic device such as a smart phone, wireless headphones or portable accessory.

Additionally, the wireless power relay device can include a jamming circuit configured to introduce a jamming signal into the first communications link, the second communications link or the power converter to distort, interfere with and make un-decodable any residual comms modulation that is un-cancelled by the constant power converter which is forward-propagating or back-propagating between the first and second communications links. The jamming circuit may be configured to produce the jamming signal by altering operation of the power converter by introducing a small signal, asynchronous to the communications propagating signal, by changing the current set-point or power-set-point, or by independently producing and injecting such a signal.

A power converter can include a power stage comprising at least one inductor and at least one switching device, a current controller configured to control the at least one switching device, an input or output current measurement circuit configured to measure the input or output current of the power stage and provide a signal corresponding to the current to the current controller, and an outer voltage loop configured to measure an output voltage of the power stage and provide an error signal corresponding to a difference between the output voltage and a reference signal to the current controller. The current controller may be a pulse width modulation controller. The outer voltage loop may be substantially slower than the current controller. For example, the bandwidth of the current control loop can be about 100 kHz and the bandwidth of the outer voltage control loop can be about 10 Hz. The power converter may further include an input or output voltage sense circuit configured to receive a voltage of the power converter and to modify the error signal received from the outer voltage loop such that an increase in voltage causes a decrease in current commanded by the current controller and a decrease in the voltage causes an increase in current commanded by the current controller. The decrease and increase in current commanded may be proportional to the corresponding increase and decrease in voltage. Such a feedback loop maintains a constant power throughput of the converter, which means that the input power and output power are regulated to a constant power by changing the set-point for the current loop by the relationship: Current Set-Point=Power Set-Point/Sensed Voltage. For maximum blocking of the back-propagating or forward-propagating signal the power calculation bandwidth or update rate for the current set-point should be as high as the current loop bandwidth e.g., 100 kHz.

A wireless power relay system can include a wireless power relay device comprising a first wireless power receiver configured to receive power wirelessly from a first wireless power transmitter and a second wireless power transmitter configured to deliver power wirelessly to a second wireless power receiver and a the second wireless power receiver. The first wireless power transmitter may be configured to communicate with the first wireless power transmitter via a first communication channel employing amplitude shift keyed or other change in power modulation of the received power from the first wireless power transmitter. The second wireless power receiver may be configured to communicate with the second wireless power transmitter via a second communication channel employing amplitude shift keyed or other power modulation of the received power from the second wireless power transmitter. The wireless power relay device may further include means for isolating the first communication channel from the second communication channel.

The means for isolating the first communication channel from the second communication channel may include a power converter coupled between the first wireless power receiver and the second wireless power transmitter, and a constant power controller configured to control the power converter. The constant power controller may include a current controller, an input or output current measurement circuit configured to measure the current of the power converter and provide a corresponding signal to the current controller, and an outer voltage loop configured to measure an output voltage of the power stage and provide an error signal to the current controller, the error signal corresponding to a difference between the output voltage and a reference signal. The outer voltage loop may be substantially slower than the current controller. The wireless power relay device may further include an input or output voltage sensing circuit configured to receive an input[or output voltage of the power converter and to modify the error signal received from the outer voltage loop such that an increase in input voltage causes a decrease in current commanded by the current controller and a decrease in the input voltage causes an increase in current commanded by the current controller. Such a feedback loop maintains a constant power throughput of the converter, which means that the input power and output power are regulated to a constant power by changing the set-point for the current loop by the relationship: Current Set-Point=Power Set-Point/Sensed Voltage. For maximum blocking of the back-propagating or forward-propagating signal the power calculation bandwidth or update rate for the current set-point should be as high as the current loop bandwidth or about 100 kHz.

Additionally, the wireless power relay device can include a jamming circuit configured to introduce a jamming signal into the first communications link to prevent the first wireless power transmitter from detecting, decoding, and improperly interpreting backpropagating signals from the second communications link. The jamming circuit may be configured to produce the jamming signal by altering operation of the power converter or by independently producing and injecting such a signal.

In another embodiment, a wireless power relay can include a first wireless power receiver configured to receive power from a first wireless power transmitter in another device. The first wireless power receiver may be configured to communicate with the first wireless transmitter via a first communication link employing amplitude shift keyed or other modulation of the received power. The relay device can further include a second wireless power transmitter configured to deliver power from the wireless power relay device to a second wireless power receiver in yet another device. The second wireless power transmitter may be configured to receive communication from the second wireless power receiver via a second communication link employing amplitude shift keyed or other modulation of the transmitted power. The wireless power relay may further include a power converter having an input coupled to the first wireless power receiver and an output coupled to the second wireless power transmitter. The wireless power relay may still further include a jamming circuit configured to introduce a jamming signal into the first communication link to prevent the first wireless power transmitter from detecting, decoding, and improperly interpreting backpropagating signals from the second communications link. The jamming circuit may be configured to produce the jamming signal by altering operation of the power converter or by independently producing and injecting such a signal.

DETAILED DESCRIPTION

Figure 1:
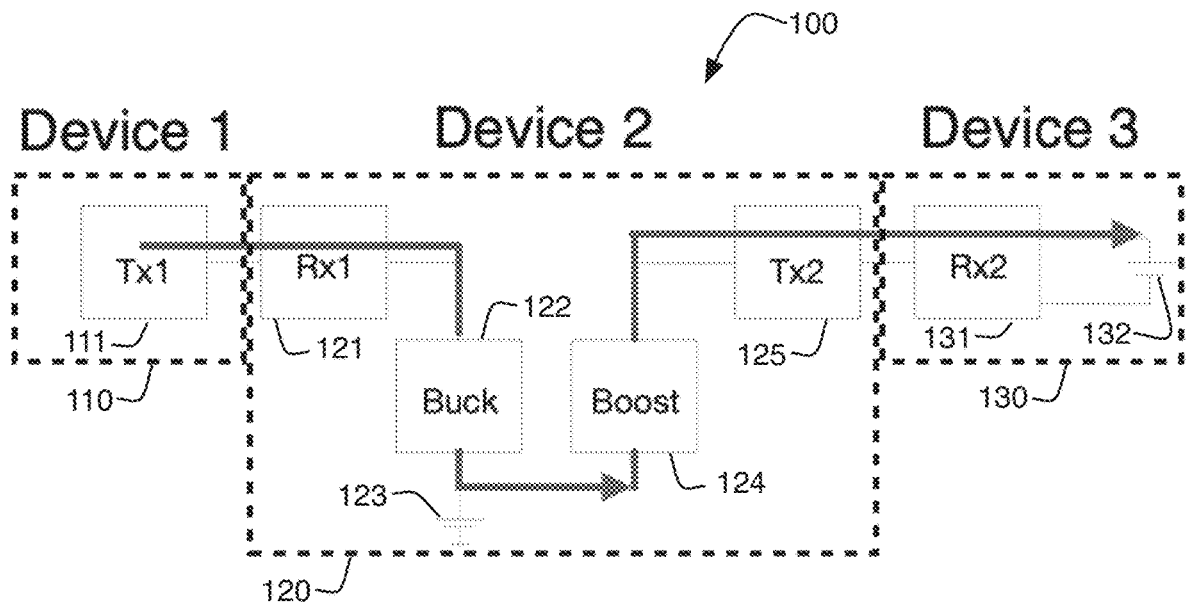
FIG. 1 illustrates a block diagram of a wireless power relay system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

As used herein "battery" refers to any of a variety of electrochemical energy storage devices that may be used in a personal electronic device. Many modern personal electronic devices employ some variation of lithium-ion cells for this purpose, although any of a large number of battery chemistries may be used in accordance with the teachings herein. Strictly speaking, the term "battery" refers to a plurality of electrochemical cells that are electrically connected in various configurations (e.g., series and/or parallel) to provide a required voltage and current capacity. Nonetheless, in the colloquial sense and as used herein, battery may refer to either a single cell or a combination of cells.

FIG. 1 illustrates an exemplary wireless power relay system 100 that includes three wireless power devices. Device 1 may be a device such as a wireless charging mat or pad 110 and may include a wireless power transmitter 111. Device 2 120 may be a wireless power relay device 120. Wireless power relay device may have a variety of configurations, and may be any suitable device configured to both receive and deliver power wirelessly. For example, the wireless power relay device may be a smart phone may be configured to receive power from a wireless charger as well as deliver power wirelessly to a wearable device, such as smart watch. As another example, a battery case for wireless earphones may be configured to receive power wirelessly from a charging mat or from a smart phone to charge its own internal battery as well as deliver power wirelessly to the wireless earphones themselves. Numerous other device types are also possible, including, for example, a battery (or other energy storage) case for a smart phone. The aforementioned device types are merely exemplary, and the teaching herein may be applied to any suitable electronic devices.

In the illustrated embodiment, wireless power relay 120 includes a receiver 121 that may receive wireless power from the wireless power transmitter 111. The receiver may deliver the received power to a buck converter 122 that may be configured to charge an internal battery 123 as well as deliver power to an internal boost converter 124. Boost converter 124 may deliver power to a wireless power transmitter 125, which may be configured to deliver power to a Device 3 130. Wireless power relay 120 may also include other electronic systems that are powered by battery 123 and/or by one or more of receiver 121, buck converter 122 and/or boost converter 124. Collectively, buck converter 122 and boost converter 124 may be considered to be a power converter. Furthermore, other converter topologies may be employed in various embodiments to achieve the effects described in greater detail herein.

Device 3 may include a receiver 131 configured to receiver power wirelessly (either from relay device 120 or transmitter device 110 or from any other suitable wireless power transmitter). Device 3 may also include a battery 132, which may be charged with the wirelessly received power. Device 3 may also include other electronic systems (not shown) that are powered by battery 132 and/or the power received wirelessly via receiver 131. Device 3 130 could also be a further wireless power relay device that receives power wirelessly from Device 2 120 and delivers power wirelessly to one or more further receiver devices. In such embodiments, Device 3 could also include buck and/or boost converters and/or other electronic systems as described with respect to Device 2.

Figure 2:
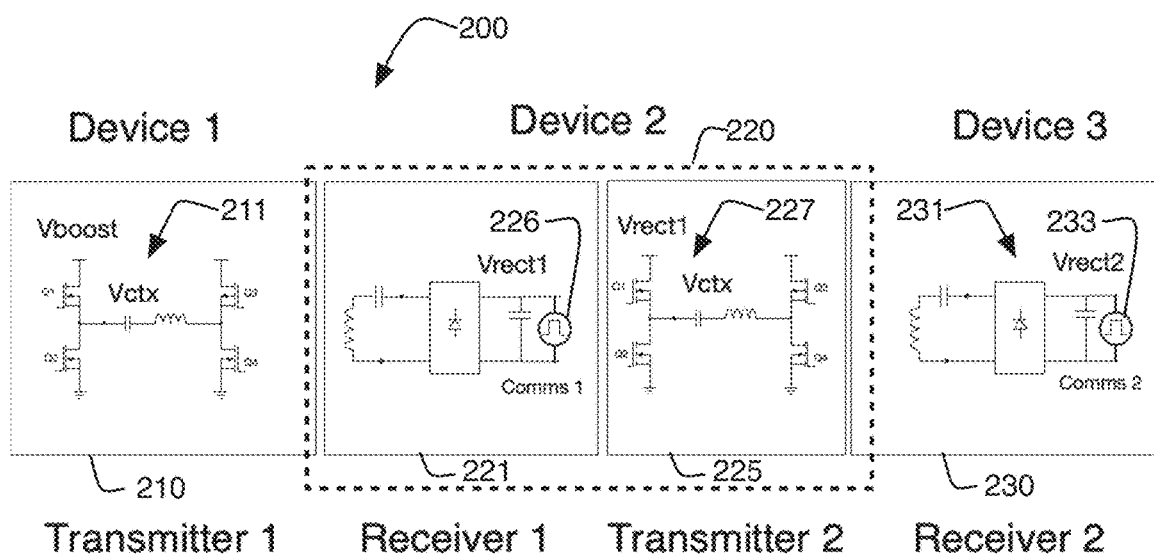
FIG. 2 is an expanded block diagram of a wireless power relay system.

FIG. 2 illustrates an expanded block diagram of a wireless power relay system 200 generally corresponding to wireless power relay system 100 discussed above. Each of Devices 1, 2, and 3 have been expanded to include simplified schematic components of the wireless power transfer components. More specifically, wireless power transmitter device 1 (210) includes a wireless power transmitter 211. Wireless power transmitter 211 may comprise an inverter, which is illustrated as a full bridge inverter made up of switches Q1, Q2, Q3, and Q4, configured to drive a resonant circuit including a transmitter coil (represented by the illustrated inductor) and one or more tuning capacitors (represented by the illustrated capacitor). Other topologies are also possible, and the illustrated arrangement is exemplary only.

Relay Device 2 220 includes receiver 221 and transmitter 225. Receiver 225 includes receiver coil and tuning capacitor, illustrated respectively by the inductor and capacitor. The received signal is rectified by the illustrated rectifier block to generate a voltage Vrect1, which is provided to transmitter 225 as described below. Also shown is communication circuit 226, which may be a power modulation circuit that operates as described in greater detail below. The illustrated simplified schematic is exemplary only, and additional components and/or other topologies may also be provided. Transmitter 225, like transmitter 210, may include an inverter 227. In the illustrated simplified schematic, the inverter is a full bridge inverter made up of switching devices Q1-Q4, which drives a resonant circuit made up of the transmitter coil (represented by the illustrated inductor) and any tuning capacitors (represented by the illustrated capacitor). The inverter receives as its input voltage the rectifier output voltage Vrect1 (although it may be passed through one or more converters, such as buck converter 122 and boost converter 124 discussed above). As above, the illustrated simplified schematic is exemplary only, and additional components and/or other topologies may also be provided.

Finally, receiver Device 3 230 includes receiver circuit 231. Receiver 231 includes receiver coil and tuning capacitor, illustrated respectively by the inductor and capacitor. The received signal is rectified by the illustrated rectifier block to generate a voltage Vrect2. Also shown is communication circuit 233, which may be a modulation circuit that operates as described in greater detail below. The illustrated simplified schematic is exemplary only, and additional components and/or other topologies may also be provided.

The devices making up wireless power relay system 100/200 may employ any of a variety of techniques for communicating among themselves. A wireless power transmitter and a wireless power receiver may have some form of communication for a variety of reasons, including as non-limiting examples: (1) allowing the transmitter to determine whether a suitable receiver is present, (2) allowing the receiver to communicate its power requirements to the transmitter, and (3) allowing the transmitter to determine whether the receiver is actually receiving the power transmitter is delivering (and, by inference, whether a foreign object is present). In some embodiments, out of band communication channels (i.e., separate from the wireless power transmission) may be provided between transmitter and receiver. These may be various radio communication channels, such as WiFi, Bluetooth, and the like or other types of connections. One disadvantage of separate communication channels is the added cost associated with the communication hardware (e.g., radios) as well as the configuration issues associated with their use.

Thus, it may be preferable for wireless power transfer systems to use various forms of in-band communication amongst themselves, by which it is meant that the transmitted power signal itself may be manipulated (i.e., modulated) by the transmitter and/or the receiver, with these manipulations being detected by the complementary device. As an example, a transmitter may employ frequency shift keying (FSK) communication, in which the frequency of the transmitted signal is modulated to send data to the receiver. As one non-limiting example, the transmitter may alternate operation between a first frequency and a second frequency to encode digital 1's and 0's. The complementary receiver device may be configured to detect these frequency changes and decode the associated digital communication. It will be appreciated that alternative modulation schemes could also be used.

To create a communication channel in the reverse direction, a receiver may employ amplitude shift keying (ASK) communication, in which the amplitude of the wireless power signal is modulated to send data back to the transmitter. As one non-limiting example, a receiver device may include a switchable load in parallel with the normal system load, which switchable load may be alternately engaged and disengaged to change the voltage appearing across and/or current drawn from the receiver coil, which is then electromagnetically reflected into the transmitter coil. (It will be appreciated that the transmitter coil and the receiver coil are essentially an air-core transformer.) These changes in amplitude may be used to encode digital 1's and 0's, and the complementary transmitter device may be configured to detect these amplitude changes and decode the associated digital communication. It will be appreciated that alternative modulation schemes could also be used.

As noted above, wireless power relay device 120 includes a buck converter 122 and a boost converter 124 in the power path. One purpose of this double conversion is the isolation of communication signals between Device 1 and Device 2 (i.e., between transmitter 111 and receiver 121) from communication signals between Device 2 and Device 3 (i.e., between transmitter 125 and receiver 131). In particular, isolation of the ASK signals is desirable, if not necessary. As will be appreciated, if messages from receiver 131 in Device 3 intended for transmitter 125 in Device 2 were instead received, decoded and acted upon by transmitter 111 in Device 1, erroneous operation could result. For example, when battery 132 becomes fully charged, receiver 131 may send a signal that it no longer needs power to transmitter 125, which is intended to cause transmitter 125 to shut down. However, if this message were also received by transmitter 111, then transmitter 111 may also shut down, which may prevent Device 2 from charging battery 123. As a result, battery 123 may not be fully charged when needed by a user.

However, this double conversion is not without disadvantages. First, the mere presence of the additional components required increases cost, complexity, and number of potential failure points of Device 2. Second, requiring double conversion of the power transmitted from Device 1 to Device 3 via relay Device 2 decreases the overall efficiency of the system. Thus, it may be desirable in at least some instances to eliminate this required double conversion; however, it may be preferable to do so in a way that maintains the communication isolation discussed above.

Figure 3:
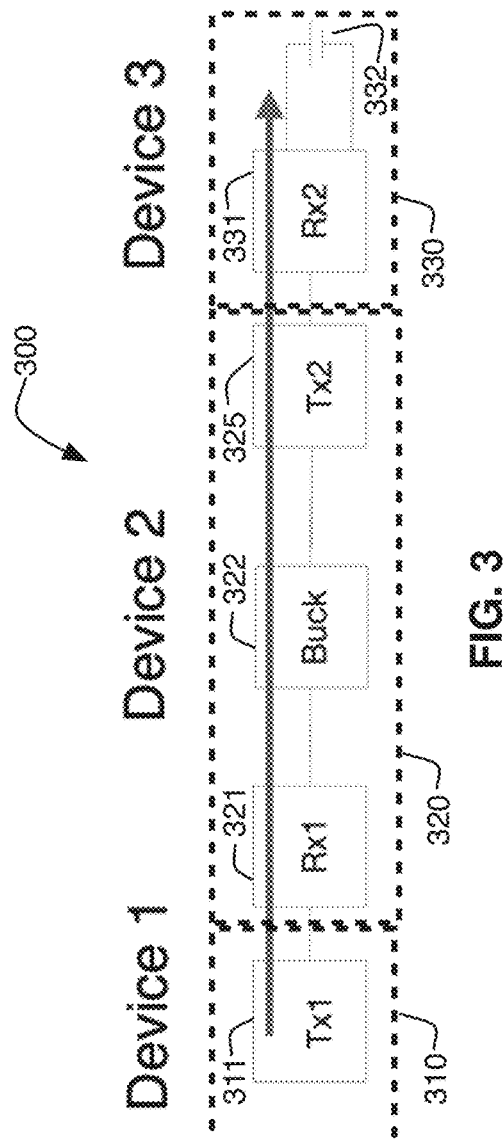
FIG. 3 is a block diagram of a wireless power relay system including a wireless power relay device incorporating a power converter with constant power control.

FIG. 3 illustrates an alternative wireless power relay system 300. As with wireless power relay system 100 discussed above with reference to FIG. 1, wireless power system 300 includes three devices. Device 1 310 may include a wireless power transmitter 311 and may be a device such as a charging mat or pad. Device 2 320 may be a wireless power relay device that both receives power wirelessly from Device 1 and provides power wirelessly to Device 3. Device 3 330 may be a wireless power receiver device that includes a wireless power receiver 331 and a battery 332 as well as other electronic systems and components (not shown) that are powered by receiver 331 and/or battery 332. As above, additional wireless power relay devices could also be provided. Similarly, either transmitter Device 1 or relay Device 2 could be configured to deliver power wirelessly to more than one relay or receiver device.

Wireless power relay Device 2 320 may include a wireless receiver 321 that may be configured to receive power wirelessly from transmitter 311. Receiver 321 may deliver the received power to a buck converter 322, which may be controlled as described in greater detail below to provide communication channel isolation between devices. Buck converter 322 may deliver power to wireless power transmitter 325, which may be configured to deliver power wirelessly to receiver 331 in device 3. In other embodiments, buck converter could be replaced with an alternative converter topology, and thus buck converter 322 may be considered more generally to be a power converter, with a buck converter being one non-limiting example.

Figure 4:
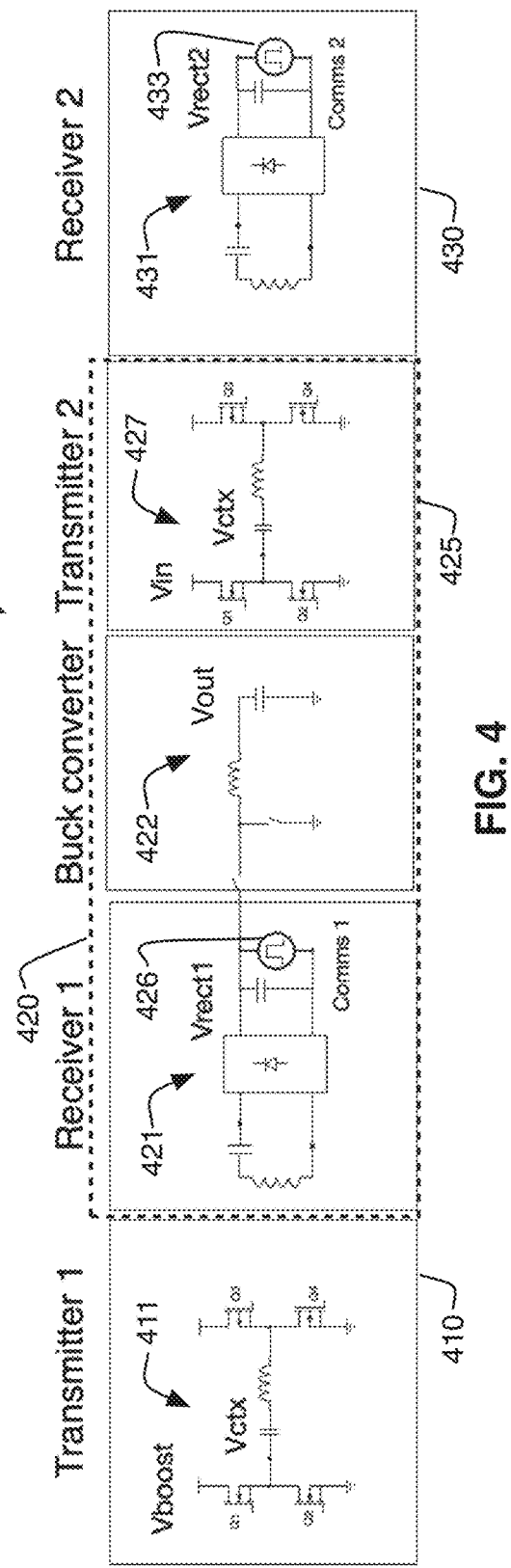
FIG. 4 is an expanded block diagram of a wireless power relay system including a wireless power relay device incorporating a power converter with constant power control.

FIG. 4 illustrates an expanded block diagram of a wireless power relay system 400 generally corresponding to wireless power relay system 300 discussed above. Each of Devices 1, 2, and 3 have been expanded to include simplified schematic components of the wireless power transfer components. More specifically, wireless power transmitter device 1 (410) includes a wireless power transmitter 411. Wireless power transmitter 411 may comprise an inverter, which is illustrated as a full bridge inverter made up of switches Q1, Q2, Q3, and Q4, configured to drive a resonant circuit including a transmitter coil (represented by the illustrated inductor) and one or more tuning capacitors (represented by the illustrated capacitor). Other topologies are also possible, and the illustrated arrangement is exemplary only.

Relay Device 2 420 includes receiver 421 and transmitter 425. Receiver 421 includes a receiver coil and at least one tuning capacitor, illustrated respectively by the inductor and capacitor. The received signal is rectified by the illustrated rectifier block to generate a voltage Vrect1, which is provided to transmitter 425 via buck converter 422 as described in greater detail below. Also shown is communication circuit 426, which may be an amplitude shift keying (ASK) circuit that operates as described in greater detail above or may be any other suitable modulation circuit. The illustrated simplified schematic is exemplary only, and additional components and/or other topologies may also be provided. Transmitter 425, like transmitter 410, may include an inverter 427. In the illustrated simplified schematic, the inverter is a full bridge inverter made up of switching devices Q1-Q4, which drives a resonant circuit made up of the transmitter coil (represented by the illustrated inductor) and any tuning capacitors (represented by the illustrated capacitor). The inverter receives as its input voltage Vout via buck converter 422, which receives as its input the rectifier output voltage Vrect1. As above, the illustrated simplified schematic is exemplary only, and additional components and/or other topologies may also be provided.

Finally, receiver Device 3 430 includes receiver circuit 431. Receiver 431 includes receiver coil and tuning capacitor, illustrated respectively by the inductor and capacitor. The received signal is rectified by the illustrated rectifier block to generate a voltage Vrect2. Also shown is communication circuit 433, which may be an amplitude shift keying (ASK) circuit that operates as described in greater detail above or may be any other suitable modulation circuit. The illustrated simplified schematic is exemplary only, and additional components and/or other topologies may also be provided.

As illustrated in FIG. 4, wireless power relay Device 2 420 may include a buck converter 422 that receives as an input the output voltage of receiver 421 (Vrect1) and produces as an output an input voltage Vin for transmitter 425. One purpose of buck converter 422 may be to attenuate or eliminate communication leak signal between wireless link 1 (i.e., the link between transmitter 411 and receiver 421) and wireless link 2 (i.e., the link between transmitter 427 and receiver 431). Another purpose of buck converter 422 may be to facilitate modulation for wireless link 2 to regulate the output voltage of receiver 2 (i.e., Vrect2). Buck converter 422 may be implemented with average current mode control. In some embodiments, buck converter 422 may also be implemented with average current mode control and voltage sensing. For example, this may take the place of an input voltage feed forward signal as described below. Two different potential implementations of buck converter 422 are illustrated in FIG. 5 (constant power with voltage sensing) and FIG. 6 (constant power).

Figure 5A:
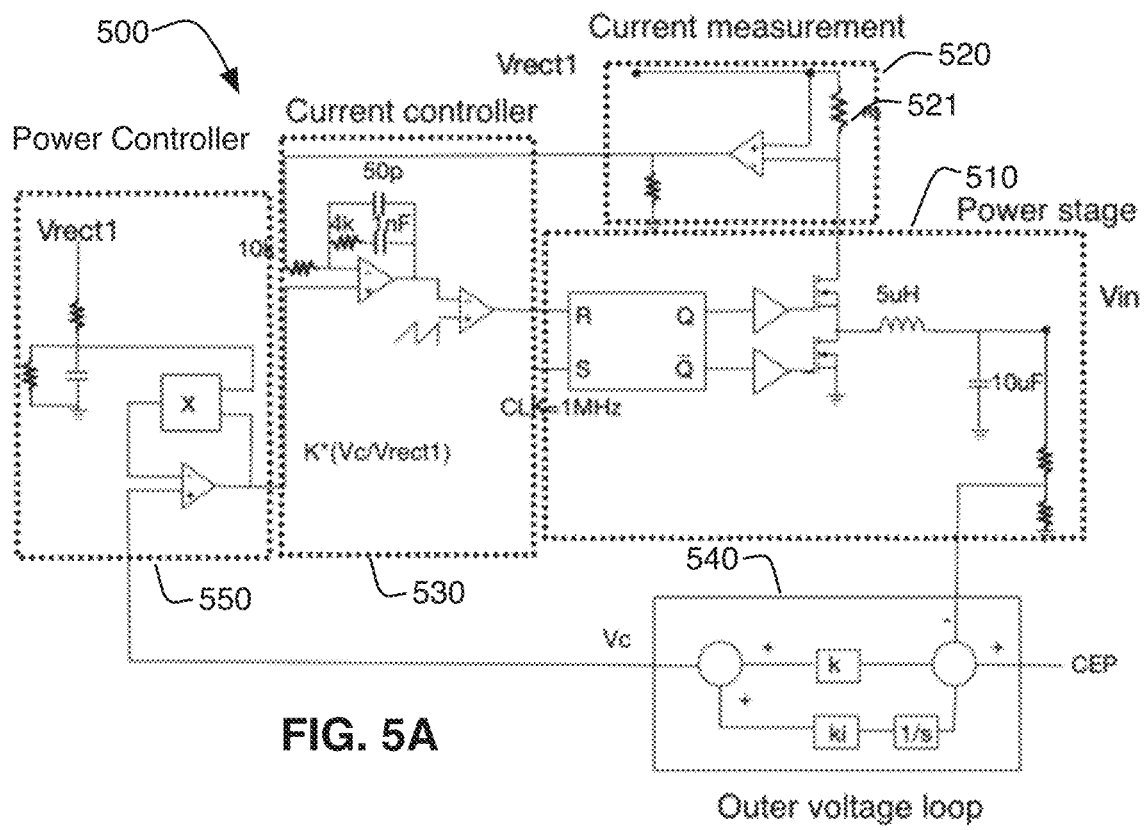
FIG. 5A is a schematic diagram of an input power controlled power converter with voltage sensing.
Figure 5B:
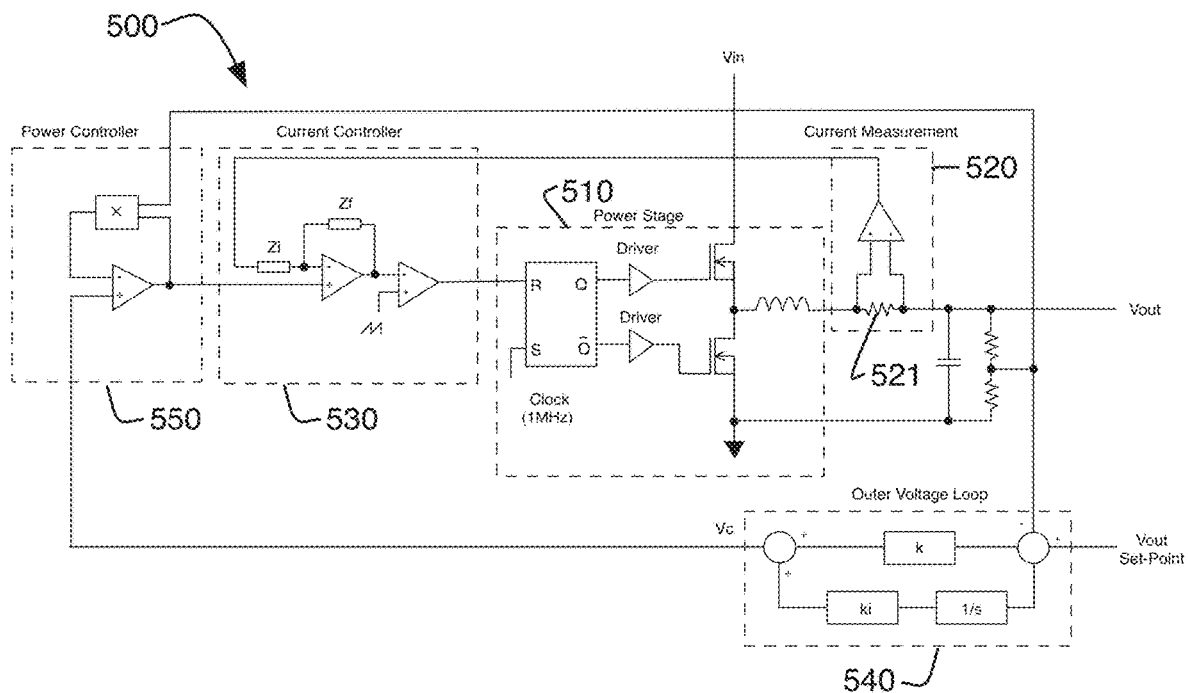
FIG. 5B is a schematic diagram of an output power controlled power converter with voltage sensing.

FIGS. 5 and 5B illustrates alternative implementations of a buck converter 500 for use in a wireless power relay device/system as described above, although as noted above other converter topologies could be used as appropriate for a given embodiment. Buck converter 500 can include power stage 510, which includes the buck converter switching devices, the buck inductor, an optional output filter capacitor, and the drive circuitry associated with the power switches. Power stage 510 may be different for other converter topologies. Buck converter 500 may also include current measurement circuit 520 that cooperates with current controller 530 as a first control loop for buck converter 500. More specifically, in FIG. 5A, illustrated current measurement circuit 520 measures the input current of the buck converter (i.e., the current flowing through resistor 521) and provides this current signal to current controller 530. In FIG. 5B, illustrated current measurement circuit 520 measures the output current of the buck converter. The illustrated configuration of current measurement circuit 520 is but one example, and other configurations of current measurement circuits may be provided. For example, although the control circuitry is depicted herein using analog control loops with error amplifiers, comparators, etc. this is for ease of understanding and illustration. Digital control based on custom logic or programmable controllers, such as microprocessors or microcontrollers, could also be used to implement the described functionality and may be preferable in at least some embodiments.

Current controller 530 may be a PWM controller, which may be implemented using a variety of different circuits. In the illustrated embodiment, the current controller may include an operational amplifier that receives the buck converter current measurement from current measurement circuit 520 and implements a control loop, which may be proportional, proportional-integral (PI), or proportional-integral-derivative (PID) as appropriate for a given application. The operational amplifier may receive at another input a sensed input (or output) voltage signal from block 550 (described in greater detail below). The output signal of the operational amplifier may be provided as one input to a comparator, which may receive at its other input a ramp signal. The resulting output of the comparator is a pulse width modulated (PWM) signal that may be provided to power stage 510, e.g., to an S-R flipflop that in turn actuates the gate drivers for the buck converter power switches. Power controller 550 should preferably be high bandwidth, like current controller 530 as opposed to the relatively low bandwidth of outer voltage loop 540, discussed in greater detail below. Like all control circuitry depicted herein, some embodiments may implement corresponding functionality digitally, for example using custom control logic or a programmable controller such as a microcontroller or microprocessor.

Buck converter 530 may also include an outer voltage control loop 540 that receives as an input a signal corresponding to the output voltage of the buck converter. The voltage signal is compared to a reference generating an error signal that is provided to power control block 550, discussed below. Outer voltage control loop 540 may preferably operate much slower (i.e., at a lower bandwidth) than current control loop 530. For example, in some embodiments, current control loop 530 may operate at a bandwidth of ~100 kHz, while outer output voltage control loop 540 may operate at a bandwidth of ~10 Hz. This relatively low bandwidth can prevent buck converter 500 from responding to any ripple associated with modulated communication between Receiver 2 (331/431) and Transmitter 2 (325/425). Like the control circuitry discussed above, outer voltage control loop 540 may be implemented using analog, digital or hybrid analog/digital circuitry, including digital circuitry using custom logic or a programmable controller, microcontroller, or microprocessor.

In buck converter 500 of FIG. 5A, power controller 550 receives the voltage control signal from outer voltage control loop 540 and divides from this a signal corresponding to the input voltage of the buck converter (i.e., Vrect1). In buck converter 500 of FIG. 5B, power controller 550 receives the voltage control signal from outer voltage control loop 540 and divides from this a signal corresponding to the output voltage of the buck converter (i.e., Vout). In either case, the net result is a voltage signal that is provided to the second input of operational amplifier in current control loop 530. This voltage signal makes the current reference signal of the current control loop 530 inversely proportional to the sensed voltage (such that a decrease in voltage results in an increase in buck converter current command signal) and directly proportional to the voltage error signal. Thus, buck converter 530 becomes a constant power converter.

Figure 6A:
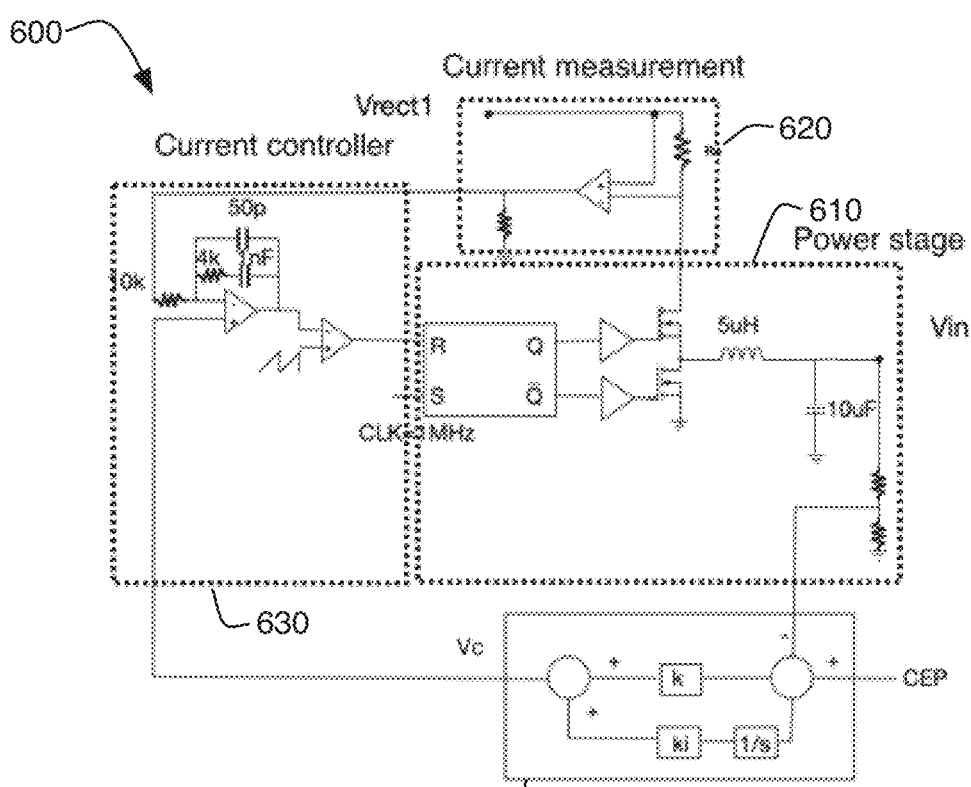
FIG. 6A is a schematic diagram of an input power controlled power converter.
Figure 6B:
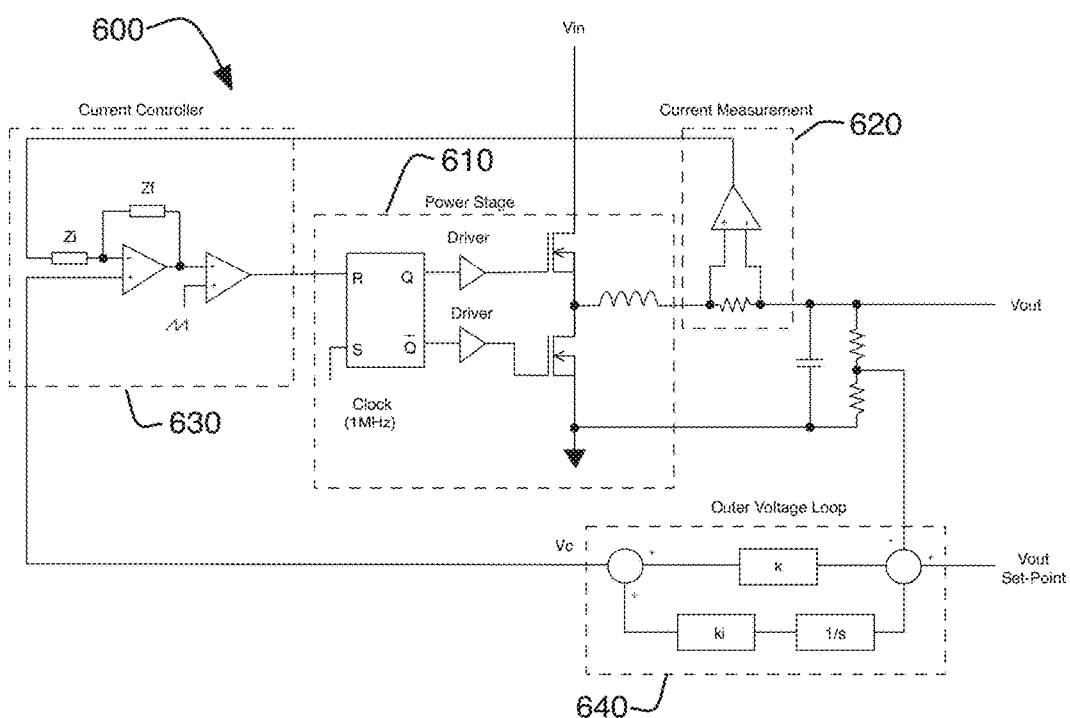
FIG. 6B is a schematic diagram of an output power controlled power converter.

FIGS. 6A and 6B illustrate further alternative implementations of a buck converter 600 for use in a wireless power relay device/system as described above; although as noted above other converter topologies could be used as appropriate for a given embodiment. Buck converter 600 can include power stage 610, which includes the buck converter switching devices, the buck inductor, an optional output filter capacitor, and the drive circuitry associated with the power switches. Buck converter 600 may also include current measurement circuit 620 that cooperates with current controller 630 as a first control loop for buck converter 600. More specifically, in FIG. 6A illustrated current measurement circuit 620 measures the input current of the buck converter (i.e., the current flowing through resistor 621) and provides this current signal to current controller 630. In FIG. 6B illustrated current measurement circuit 620 measures the output current of the buck converter (i.e., the current flowing through resistor 621) and provides this current signal to current controller 630. The illustrated configuration of current measurement circuit 620 is but one example, and other configurations of current measurement circuits may be provided. For example, although the control circuitry is depicted herein using analog control loops with error amplifiers, comparators, etc. this is for ease of understanding and illustration. Digital control based on custom logic or programmable controllers, such as microprocessors or microcontrollers, could also be used to implement the described functionality and may be preferable in at least some embodiments.

Current controller 630 may be a PWM controller, which may be implemented using a variety of different circuits. In the illustrated embodiment, the current controller may include an operational amplifier that receives the buck converter current measurement from current measurement circuit 620 and implements a proportional, proportional integral (PI), or proportional integral derivative (PID) control loop. The operational amplifier may receive at another input a voltage control signal from outer voltage control loop 640 (described in greater detail below). The output signal of the operational amplifier may be provided as one input to a comparator, which may receive at its other input a ramp signal. The resulting output of the comparator is a pulse width modulated (PWM) signal that may be provided to power stage 610, e.g., to an S-R flipflop that in turn actuates the gate drivers for the buck converter power switches. Like all control circuitry depicted herein, some embodiments may implement corresponding functionality digitally, for example using custom control logic or a programmable controller such as a microcontroller or microprocessor.

Outer voltage control loop 640 may receive as an input the output voltage of the buck converter and provides a feedback signal that is delivered current controller 630. Outer voltage control loop 640 may preferably operate much slower (i.e., at a lower bandwidth) than current control loop 630. For example, in some embodiments, current control loop 630 may operate at a bandwidth of ~100 kHz, while outer output voltage control loop 640 may operate at a bandwidth of ~10 Hz. This relatively low bandwidth can prevent buck converter 600 from responding to any ripple associated with modulated communication between Receiver 2 (331/431) and Transmitter 2 (325/425). Like the control circuitry discussed above, outer voltage control loop 540 may be implemented using analog, digital or hybrid analog/digital circuitry, including digital circuitry using custom logic or a programmable controller, microcontroller, or microprocessor.

In buck converter 600, current controller 630 receives the voltage control signal from outer voltage control loop 540. The result is an output voltage feedback signal that is provided to the second input of operational amplifier in current control loop 630. This output voltage feedback signal makes the current reference signal of the current control loop directly proportional to the output voltage control signal (such that an increase in the output voltage control signal results in an increase in the buck converter current command signal). But because the output voltage loop is much slower than the modulated communication signal (e.g., ~10 Hz vs. 1-2 kHz), output power may not perfectly constant and modulated signal leak through may only be completely prevented from output to input. Thus, buck converter 530 is in effect a substantially constant power converter, which is nonetheless considered to be a constant power converter as that term is used herein. However, because of the lack of power controller 550 as described above with reference to FIG. 5, buck converter 600 may still allow some modulated control signal pass through as illustrated below with reference to FIGS. 7A and 7B.

Figure 7A:
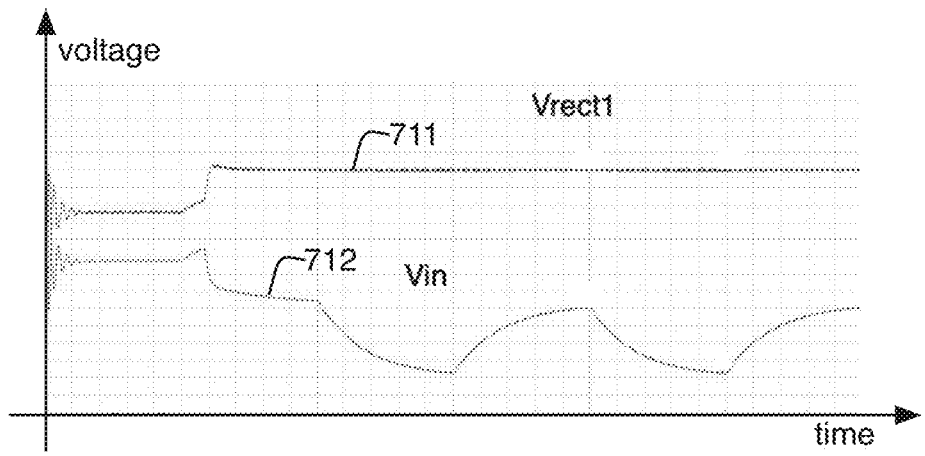
FIGS. 7A & 7B illustrate certain waveforms of a wireless power relay system including a wireless power relay device incorporating a constant power controlled power converter.
Figure 7B:
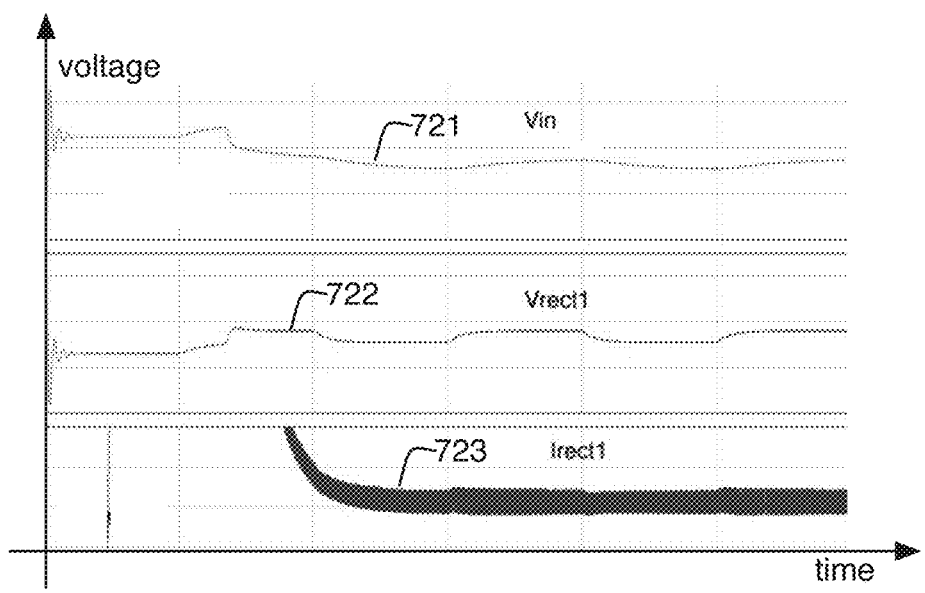

FIGS. 7A and 7B illustrate certain waveforms associated with a wireless power relay system as illustrated in FIG. 4 that implements a buck converter with a constant power controller as in FIG. 6A/6B, but without the constant power control block 550 illustrated in FIG. 5A/5B. FIG. 7A illustrates certain waveforms during communication between Receiver 2 430 and Transmitter 2 425. More specifically, FIG. 7A curve 711 plots Vrect1 (i.e., the voltage at the output of the rectifier of Receiver 1 421) during ASK communications between Receiver 2 430 and Transmitter 2 425. (ASK communication is used as one example, but other modulation schemes could also be used.) Voltage Vrect1 is also the input voltage into buck converter 422. Curve 712 plots Vin (i.e., the voltage at the input of the inverter of Transmitter 2 425) during modulated communication between Receiver 2 430 and Transmitter 2 425. Voltage Vin is also the output voltage of buck converter 422. As can be seen from the illustrated waveforms, current mode control fixes the input current of buck converter 422. More specifically, because the input voltage to Transmitter 1 410 is fixed (i.e., Vboost is fixed), the rectifier output voltage of Receiver 1 421 is also fixed. In other words, the power delivered at the output of Receiver 1 is constant. Thus, there is no leak through of the modulated signal associated with communication between Receiver 2 and Transmitter 2.

FIG. 7B illustrates certain waveforms during communication between Receiver 1 421 and Transmitter 1 410. More specifically, FIG. 7B curve 721 plots Vin (i.e., the voltage at the input of Transmitter 2 425) during modulated communication between Receiver 1 421 and Transmitter 1 410. Voltage Vin is also the output voltage of buck converter 422. Curve 722 plots Vrect1 (i.e., the voltage at the output of the rectifier of Receiver 1 421) during modulated communications between Receiver 1 421 and Transmitter 1 410. Voltage Vrect1 is also the input voltage into buck converter 422. Curve 723 plots the rectifier current Irect1, which is the output current of Receiver 1, 421. As can be seen from the illustrated waveforms, the current mode control fixes the input current within a reasonably narrow range; however, because the input voltage is changing the input power will also change resulting in modulated signal leak through to the output (i.e., to Transmitter 2).

Figure 8A:
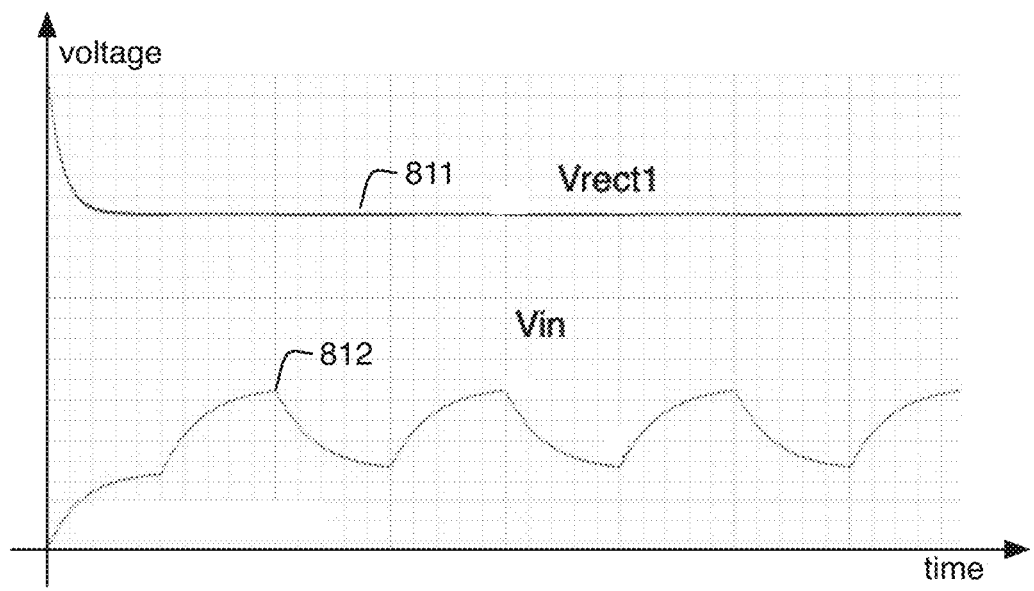
FIGS. 8A & 8B illustrate certain waveforms of a wireless power relay system including a wireless power relay device incorporating a constant power controlled power converter with input voltage sensing.

As noted above, incorporation of constant power control block 550 into the control of buck converter 422 can prevent this modulated signal leak through during communication between Receiver 1 410 and Receiver 1 421. Illustrative waveforms are plotted in FIGS. 8A and 8B. More specifically, FIG. 8A curve 811 plots Vrect1 (i.e., the voltage at the output of the rectifier of Receiver 1 421) during modulated communications between Receiver 2 430 and Transmitter 2 425. Voltage Vrect1 is also the input voltage into buck converter 422. Curve 812 plots Vin (i.e., the voltage at the input of the inverter of Transmitter 2 425) during modulated communication between Receiver 2 430 and Transmitter 2 425. Voltage Vin is also the output voltage of buck converter 422. As can be seen from the illustrated waveforms, current mode control fixes the input current of buck converter 422. More specifically, because the input voltage to Transmitter 1 410 is fixed (i.e., Vboost is fixed), the rectifier output voltage of Receiver 1 421 is also fixed. In other words, the power delivered at the output of Receiver 1 is constant. Thus, there is no leak through of the modulated signal associated with communication between Receiver 2 and Transmitter 2.

Figure 8B:
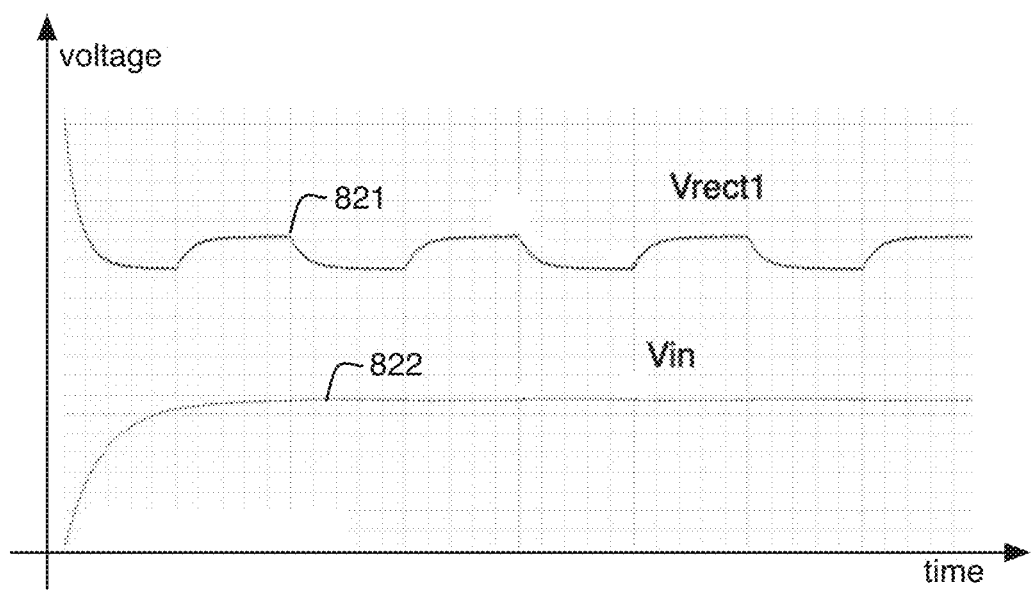

FIG. 8B illustrates certain waveforms during communication between Receiver 1 421 and Transmitter 1 410. More specifically, FIG. 8B curve 822 plots Vin (i.e., the voltage at the input of Transmitter 2 425) during modulated communication between Receiver 1 421 and Transmitter 1 410. Voltage Vin is also the output voltage of buck converter 422. Curve 821 plots Vrect1 (i.e., the voltage at the output of the rectifier of Receiver 1 421) during modulated communications between Receiver 1 421 and Transmitter 1 410. Voltage Vrect1 is also the input voltage into buck converter 422. Because the current reference signal of buck converter 422 is changed in a way that is inversely proportional to the input voltage, the input power of buck converter 422 is truly fixed, and thus there is no modulated signal leak through during communication between Transmitter 1 and Receiver 1.

Depending on the particular details of a particular implementation of a wireless power relay system, a buck converter as illustrated in FIG. 6 may be suitable. However, in other wireless power relay applications, it may be desirable to provide a buck converter including constant power control block 550 (as illustrated in FIG. 5) to provide a further degree of modulated signal leak through prevention.

Figure 9:
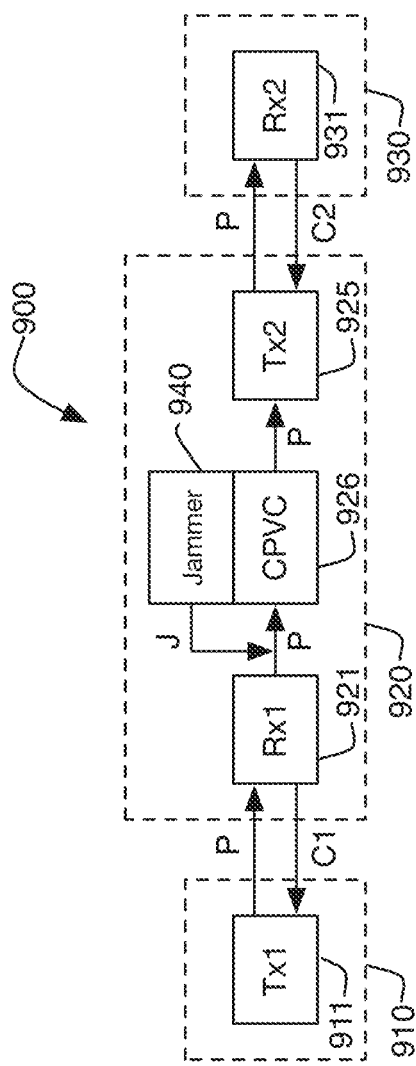
FIG. 9 illustrates a block diagram of a wireless power relay system including a wireless power relay device incorporating a jamming circuit.

In some embodiments, it may be desirable to augment the arrangements described above to provide for enhanced comms isolation. FIG. 9 illustrates an arrangement in which a first device 910 includes a wireless power transmitter Tx1/911 that delivers power to and communicates with a first wireless power receiver Rx1/921 included in wireless power relay 920. The power delivery path P illustrates the direction of power flow and the receiver to transmitter comms path C1 illustrates the receiver to transmitter communications, which may take place using amplitude various schemes of modulating the power signal. There may also be a forward communication path (not shown) that may employ any suitable modulation scheme. Wireless power relay 920 may include a constant power converter 926, such as one of the embodiments described above. Constant power converter 926 may deliver power from first communications receiver 921 to second wireless power transmitter Tx2/925. As in the above described embodiments, second wireless power transmitter 925 may deliver power to a second wireless power receiver Rx2/931 in a third device 930. As above, power delivery path P illustrates the direction of power flow and the receiver to transmitter comms path C2 illustrates the receiver to transmitter communications, which may take place using any suitable modulation scheme. There may also be a forward communication path (not shown) that may employ any suitable modulation scheme.

Depending on the particulars of a given embodiment, constant power converter 926 may sufficiently attenuate forward propagation of the C1 communications through converter 926 to second wireless power transmitter 925; however, the reverse may not be true. Thus, it is possible that backpropagation of the C2 communications through converter 926 may cause a significantly attenuated but still detectable C2 signal to appear on the C1 comms path. Depending on the sensitivity of the communications receiver in first wireless power transmitter 911, this signal may be detected and decoded by the first wireless power transmitter and erroneously interpreted as instructions for the first power transmitter 911, when such communications were actually intended for second wireless power transmitter 925. To prevent this, a jammer 940 may be used to introduce a jamming signal J as illustrated in FIG. 9. Jamming signal J may have amplitude and frequency characteristics that may be selected to overwhelm any attenuated backpropagating instance of the C2 communications signal. Jamming signal J will thus also backpropagate through receiver 921 and via comms path C1, overwhelming the attenuated backpropagating C2 signal, rendering it impossible for the communications receiver in first power transmitter 911 to detect, decode, and erroneously interpret the C2 signal. In other words, jamming signal J may effectively be "noise" injected into the C1 comms path to overwhelm any backpropagating C2 signal along the C1 path.

In some embodiments, jammer 940 may produce the jamming signal J by selectively altering operation of constant power converter 926. For example, jammer 940 may be configured to intermittently apply small changes to the setpoint or current reference signal of power converter 926, causing changes in the operation of converter 926 that introduce the required jamming signal J. As an example, a microprocessor or microcontroller used as a controller for converter 926 may respond to an intermittent interrupt to perturb the digital to analog converter outputting the setpoint signal to the PWM loop. Many other implementations are possible, and any method for slightly perturbing operation of converter 926 in a way that is substantially independent of the operating duty cycle, frequency, etc. of the converter will be sufficient. In other embodiments, jammer 940 may generate a jamming signal by other means independent of power converter 926. In any case, so long as the resulting jammer signal J is larger than any residual back propagating C2 signal, the desired operation will be achieved.

A jamming circuit as described above may also be used in wireless power relay systems that do not include a constant power converter as described above. In other words, constant power converter 926 may be replaced with a non-constant power converter, and the jamming technique described above may still be suitable to prevent first wireless power transmitter 911 from detecting, decoding, and erroneously interpreting the comms signal from second wireless power receiver 931 to second wireless power transmitter 925.

The foregoing describes exemplary embodiments of a wireless power relay system incorporating a buck converter with input power control. Such systems may be used in a variety of applications but may be particularly advantageous when used in conjunction with battery powered personal electronic devices such as smartphones, smart watches, tablet computers, laptop computers, and associated accessories. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A wireless power relay device comprising:
   a first wireless power receiver that receives power from a first wireless power transmitter in another device, wherein the first wireless power receiver communicates with the first wireless transmitter via a first communication link employing modulation of the received power;
   a second wireless power transmitter that delivers power from the wireless power relay device to a second wireless power receiver in another device simultaneously with the first wireless power receiver receiving power from the first wireless power transmitter, wherein the second wireless power transmitter receives communication from the second wireless power receiver via a second communication link employing modulation of the transmitted power; and
   a power converter having an input coupled to the first wireless power receiver and an output coupled to the second wireless power transmitter, the power converter having a constant power controller that isolates modulated communication between the first and second communication links.

2. The wireless power relay device of claim 1 wherein the power converter comprises:
   a power stage comprising at least one inductor and at least one switching device;
   an inner current control loop that controls the at least one switching device;
   a current measurement circuit that measures at least one of the input or output current of the power stage and provides a signal corresponding to the measured current to the inner current control loop; and
   an outer voltage control loop that measures at least one of an output voltage or an input voltage of the power stage and provides an error signal corresponding to a difference between the measured voltage and a reference signal to the inner current control loop.

3. The wireless power relay device of claim 2 wherein the inner current control loop is a pulse width modulation controller.

4. The wireless power relay device of claim 2 wherein the outer voltage control loop is substantially slower than the current controller.

5. The wireless power relay device of claim 4 wherein a bandwidth of the inner current control loop is about 100 kHz and a bandwidth of the outer voltage control loop is about 10 Hz.

6. The wireless power relay device of claim 2 further comprising a voltage sensing circuit that receives a voltage of the power converter and modifies the error signal received from the outer voltage control loop such that an increase in voltage causes a decrease in current commanded by the inner current control loop and a decrease in the voltage causes an increase in current commanded by the inner current control loop.

7. The wireless power relay device of claim 6 wherein the decrease and increase in current commanded are proportional to the corresponding increase and decrease in voltage.

8. The wireless power relay device of claim 1 further comprising a battery that stores energy received via the first wireless power receiver and delivers energy to the second wireless transmitter.

9. The wireless power relay device of claim 8 wherein the wireless power relay device is a battery case for a portable electronic device.

10. The wireless power relay device of claim 9 wherein the battery case is a battery case for a smart phone or wireless headphones.

11. The wireless power relay device of claim 1 further comprising a jamming circuit that isolates communications on the first communication link from communications on the second communication link by introducing a jamming signal into the first communication link.

12. The wireless power relay device of claim 11 wherein the jamming circuit is produces the jamming signal by altering operation of the power converter.

13. A power converter comprising:
    a power stage comprising at least one inductor and at least one switching device; and
    a constant power controller, the constant power controller further comprising:
        an inner current control loop comprising a current controller that controls the at least one switching device;
        a current measurement circuit that measures at least one of an input current or output current of the power stage and provides a signal corresponding to the measured current to the inner current control loop; and
        an outer voltage control loop that measures at least one of an input voltage or an output voltage of the power stage and provides an error signal corresponding to a difference between the measured voltage and a reference signal to the inner current control loop.

14. The power converter of claim 13 wherein the inner current control loop is a pulse width modulation controller.

15. The power converter of claim 13 wherein the outer voltage control loop is substantially slower than the current controller.

16. The power converter of claim 15 wherein a bandwidth of the inner current control loop is about 100 kHz and a bandwidth of the outer voltage control loop is about 10 Hz.

17. The power converter of claim 13 further comprising a voltage sensing circuit that receives a voltage of the power converter and modifies the error signal received from the outer voltage control loop such that an increase in voltage causes a decrease in current commanded by the inner current control loop and a decrease in the voltage causes an increase in current commanded by the inner current control loop.

18. The power converter of claim 17 wherein the decrease and increase in current commanded are proportional to the corresponding increase and decrease in voltage.

19. A wireless power relay system comprising:
    a wireless power relay device comprising a first wireless power receiver that receives power wirelessly from a first wireless power transmitter and a second wireless power transmitter that delivers power wirelessly to a second wireless power receiver simultaneously with the first wireless power receiver receiving power from the first wireless power transmitter; and
    the second wireless power receiver;
    wherein:

the first wireless power receiver communicates with the first wireless power transmitter via a first communication channel employing modulation of the received power from the first wireless power transmitter, and the second wireless power receiver communicates with the second wireless power transmitter via a second communication channel employing modulation of the received power from the second wireless power transmitter; and the wireless power relay device further comprises means for isolating the first communication channel from the second communication channel.

20. The wireless power relay system of claim 19 wherein the means for isolating the first communication channel from the second communication channel comprises:
a power converter coupled between the first wireless power receiver and the second wireless power transmitter; and
a constant power controller that controls the power converter.

21. The wireless power relay system of claim 20 wherein the constant power controller comprises:
an inner current control loop;
a current measurement circuit that measures at least one of an input current or output current of the power converter and provides a corresponding signal to the inner current control loop; and
an outer voltage control loop that measures at least one of an input voltage or an output voltage of the power converter and provides an error signal to the inner current control loop, the error signal corresponding to a difference between the measured voltage and a reference signal.

22. The wireless power relay system of claim 21 wherein the outer voltage control loop is substantially slower than the inner current control loop.

23. The wireless power relay system of claim 21 further comprising a voltage sensing circuit that receives a voltage of the power converter and modifies the error signal received from the outer voltage control loop such that an increase in voltage causes a decrease in current commanded by the inner current control loop and a decrease in voltage causes an increase in current commanded by the inner current control loop.

24. The wireless power relay device of claim 19 further comprising a jamming circuit that isolates communications on the first communication link from communications on the second communication link by introducing a jamming signal into the first communication channel.

25. The wireless power relay device of claim 24 wherein the jamming circuit produces the jamming signal by altering operation of the power converter.

26. A wireless power relay device comprising:
a first wireless power receiver that receives power from a first wireless power transmitter in another device, wherein the first wireless power receiver communicates with the first wireless transmitter via a first communication link employing modulation of the received power;
a second wireless power transmitter that delivers power from the wireless power relay device to a second wireless power receiver in another device simultaneously with the first wireless power receiver receiving power from the first wireless power transmitter, wherein the second wireless power transmitter receives communication from the second wireless power receiver via a second communication link employing modulation of the transmitted power;
a power converter having an input coupled to the first wireless power receiver and an output coupled to the second wireless power transmitter; and
a jamming circuit that isolates communications on the first communication link from communications on the second communication link by introducing a jamming signal into the first communication link.

27. The wireless power relay device of claim 26 wherein the jamming circuit produces the jamming signal by altering operation of the power converter.

* * * * *